United States Patent [19]

Yaegashi et al.

[11] Patent Number: 5,684,651
[45] Date of Patent: Nov. 4, 1997

[54] MAGNETIC DISK SYSTEM HAVING SERVO SIGNAL DETECTING FUNCTION DEPENDING ON RECORDING DENSITY OF SERVO DATA

[75] Inventors: Koji Yaegashi; Hiroshi Okamura, both of Tokyo, Japan

[73] Assignee: Kabushiki Kaisha Toshiba, Kawasaki, Japan

[21] Appl. No.: 463,789

[22] Filed: Jun. 5, 1995

[30] Foreign Application Priority Data

Feb. 2, 1995 [JP] Japan ................... 7-015887

[51] Int. Cl.$^6$ ................................. G11B 5/596
[52] U.S. Cl. .................. 360/77.08; 360/67; 360/65; 360/46
[58] Field of Search ............. 360/67, 65, 77.08, 360/77.06, 46, 32, 27, 75; 369/44.29, 44.35, 44.36, 124, 48

[56] References Cited

U.S. PATENT DOCUMENTS

| | | | |
|---|---|---|---|
| 4,564,869 | 1/1986 | Baumeister | 360/46 |
| 4,794,469 | 12/1988 | Kaida | 360/46 |
| 5,060,088 | 10/1991 | Dolivo | 360/65 |
| 5,121,262 | 6/1992 | Squires et al. | 360/46 |
| 5,245,565 | 9/1993 | Petersen | 364/825 |
| 5,309,298 | 5/1994 | Klaasen | 360/65 |
| 5,321,559 | 6/1994 | Nguyen | 360/46 |
| 5,438,558 | 8/1995 | Ohashi | 360/67 |
| 5,463,603 | 10/1995 | Petersen | 360/67 |

FOREIGN PATENT DOCUMENTS 334608  12/1993  Japan .................... 360/75 J

OTHER PUBLICATIONS

Magnetic Recording by Mee et al ©1987, pp. 244-248, 302-329.

Primary Examiner—Aristotelis M. Psitos
Assistant Examiner—Alan Faber
Attorney, Agent, or Firm—Limbach & Limbach LLP; Ronald L. Yin

[57] ABSTRACT

Servo data respectively recorded in the peripheral and innermost tracks of a magnetic disk at low and high densities in synchronism with a predetermined write period are read back and binarized by the magnetic head as flux reversal patterns. In this case, on the basis of a table stored in the EEPROM in advance, the filter characteristic of a characteristic variable type low-pass filter is variably set to be a characteristic defined by a low cutoff frequency fc and a small boost amount in the peripheral zone and to be a characteristic defined by a high cutoff frequency and a boost amount, which is large on a high-frequency side, on the central zone. The peak waveforms of a servo signal in the central side are raised to be sharpened, and a qualification level in a pulse decoder is variably set to be high in the outermost tracks and to be low in the innermost tracks. The low-pass filter receives a servo signal output from an AGC amplifier, removes a specific frequency component from the servo signal in accordance with a set filter characteristic, and sends the resultant signal to the pulse decoder as a servo signal. The pulse decoder converts the servo signal, which is uniform in the peripheral and innermost tracks of the disk, into a binary pulse in accordance with the set qualification level.

25 Claims, 7 Drawing Sheets

F I G. 1 (PRIOR ART)

FIG. 2A (PRIOR ART) AGC OUTPUT S2

FIG. 2B (PRIOR ART) FILTER OUTPUT S3

FIG. 2C (PRIOR ART) BINARY OUTPUT S4

FIG. 2D (PRIOR ART) AGC OUTPUT S2

FIG. 2E (PRIOR ART) FILTER OUTPUT S3

FIG. 2F (PRIOR ART) BINARY OUTPUT S4

| | | | ⸺109A, 109B |
|---|---|---|---|
| ZONE 1 | CUT OFF 1 | BOOST 1 | QUALIFICATION LEVEL 1 |
| ZONE 2 | CUT OFF 2 | BOOST 2 | QUALIFICATION LEVEL 2 |
| ⋮ | ⋮ | ⋮ | ⋮ |

| | FILTER CHARACTERISTIC | CUTOFF SETTING VALUE (fc) | BOOST SETTING VALUE |
|---|---|---|---|
| INNERMOST TRACKS ↕ OUTERMOST TRACKS | Z | 40 (HEX) ⌜6.8 MHZ⌟ | 5 (HEX) ⌜5.23 dB⌟ |
| | Y | 60 (HEX) ⌜5.2 MHZ⌟ | 2 (HEX) ⌜0.75 dB⌟ |
| | X | 9F (HEX) ⌜3.3 MHZ⌟ | 2 (HEX) ⌜0.75 dB⌟ |

MAGNETIC DISK SYSTEM HAVING SERVO SIGNAL DETECTING FUNCTION DEPENDING ON RECORDING DENSITY OF SERVO DATA

BACKGROUND OF THE INVENTION

1. Field of the Invention

The present invention relates to a magnetic disk system in which servo data representing track and sector positions on a magnetic disk is read out to perform positioning control for a magnetic head on the magnetic disk and, more particularly, a magnetic disk system having a servo signal detecting function depending on the recording density of servo data.

2. Description of the Related Art

In a magnetic disk serving as a storage medium for a magnetic disk system, for example, a plurality of tracks each having a predetermined width are assigned in the radial direction of the magnetic disk as a recording area for various data. In each track, sectors are assigned at predetermined intervals in the circumferential direction of the track. In each track and each sector, servo data representing the positions of the track and sector is recorded.

This servo data is recorded on the magnetic disk as a flux reversal pattern obtained by causing a track or sector address expressed by a binary number to correspond to a change in data of "1" or "0". The magnetic disk system reads back the servo data through the magnetic head to perform positioning control for the magnetic head on the magnetic disk.

Figure 1:
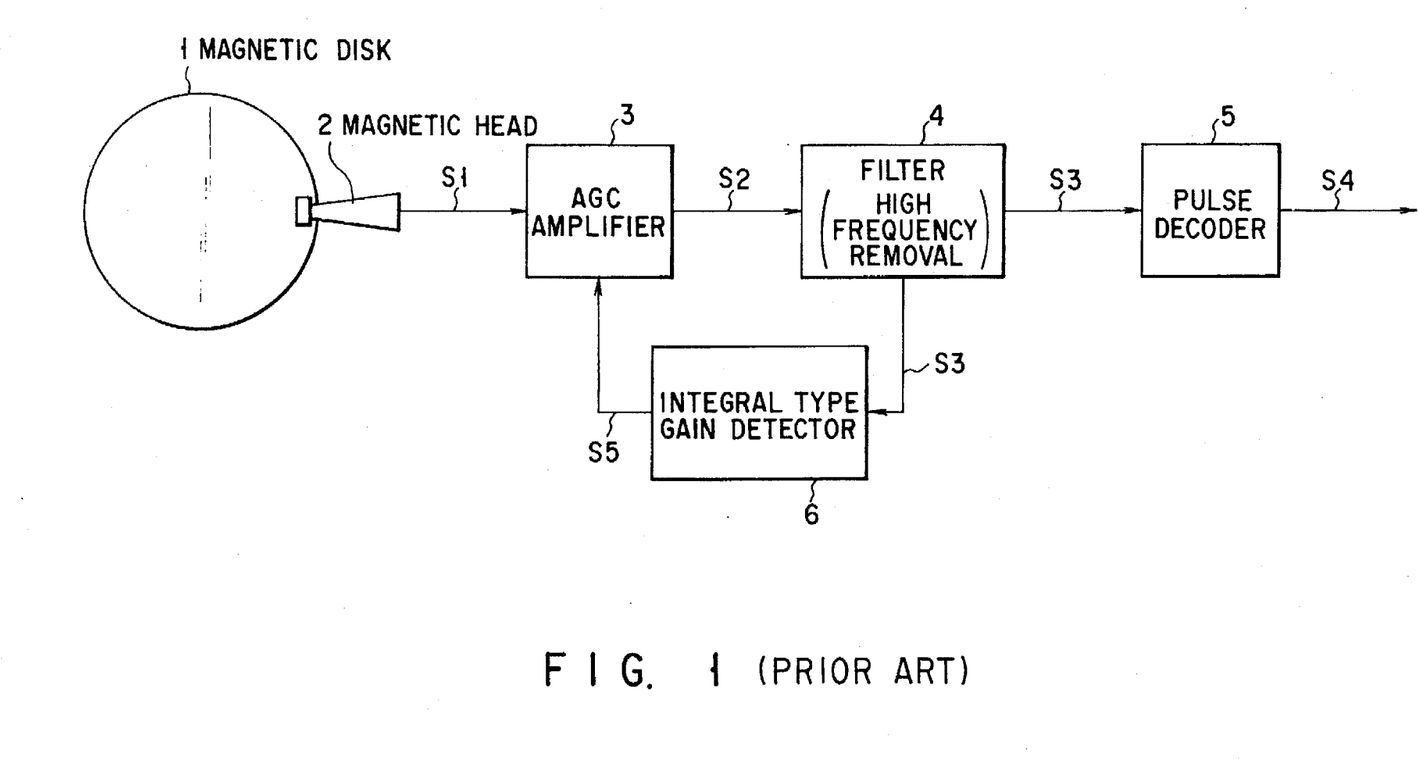
FIG. 1 is a block diagram showing an arrangement for detecting a servo signal in a conventional magnetic disk system.

A conventional arrangement for detecting a servo signal (loading servo data) in such a magnetic disk system for performing positioning control for the magnetic head is shown in FIG. 1.

Servo data recorded on a magnetic disk 1 as a flux reversal pattern is read back by a magnetic head 2. The detected servo data is output as an analog servo signal S1, and the servo signal S1 is supplied to an AGC (Automatic Gain Control) amplifier 3. The AGC amplifier 3 amplifies the analog servo signal S1 supplied from the magnetic head 2 and adjusts the level of the servo signal S1 to a predetermined signal level. The servo signal S2 having a level adjusted by the AGC amplifier 3 is supplied to a high frequency removal filter 4.

The high frequency removal filter 4 removes, in accordance with a predetermined and fixed cutoff frequency, a high-frequency noise component included in the servo signal S2 supplied from the magnetic head 2 through the AGC amplifier 3. A servo signal S3 from which the high-frequency noise component is removed by the high frequency removal filter 4 is supplied to a pulse decoder 5 and an integral-type gain detector 6.

The pulse decoder 5 detects, in accordance with a predetermined qualification level TL, peak points corresponding to the flux reversal read portions of the servo signal S3 supplied through the high frequency removal filter 4, and outputs each peak point as a binary pulse S4. In this manner, the servo data recorded on the magnetic disk 1 is recognized as a positioning address, of the magnetic head 2, representing a track, a sector, or the like.

The level of the servo signal S3 from which a high-frequency noise component is removed by the filter 4 is detected by an integral-type gain detector 6, and the servo signal S3 is fed back to the AGC amplifier 3 as a gain control signal S5. The AGC amplifier 3 adjusts an amplification gain for the servo signal S1 read from the magnetic head 2 in response to the gain control signal S5. In this manner, the level of the servo signal S2 output to the filter 4 is adjusted to a predetermined level.

Flux reversal patterns recorded on the magnetic disk 1 as servo data are generally recorded, in synchronism with a predetermined write frequency, at any position in the innermost and outermost tracks of the magnetic disk 1 rotated at a predetermined speed. For this reason, the data recording density is low in the outermost tracks of the magnetic disk 1 and high in the innermost tracks.

More specifically, the interval between the respective flux reversal portions of the servo data is large in the outermost tracks of the magnetic disk 1 and small in the innermost tracks. For this reason, when the servo data is read out by the magnetic head 2, the leading and trailing edges of a signal waveform corresponding to each flux reversal portion in the outermost tracks are different from those in the innermost tracks. In the outermost tracks, the leading and trailing edges of the signal waveform are sharp and approximate to those of an independent waveform. In the innermost tracks, waveforms are interfered with each other to dull the total waveform.

Figure 2A:
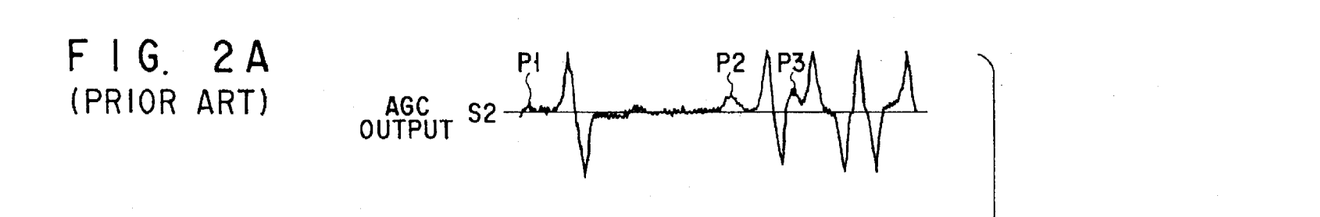
FIG. 2A shows a waveform obtained when a servo signal in an outermost tracks is output from an AGC amplifier.
Figure 2B:
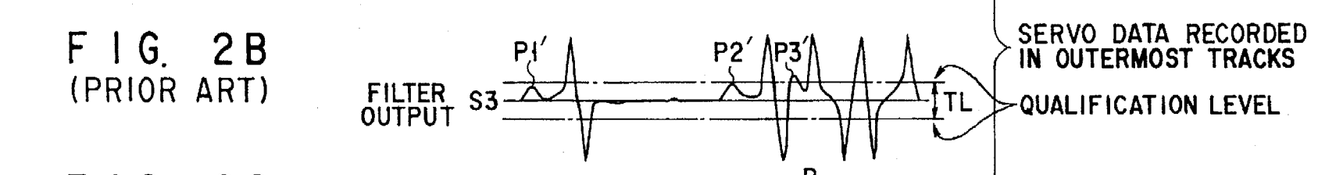
FIG. 2B shows a waveform obtained when the servo signal in the outermost tracks is output from a low-pass filter.
Figure 2C:
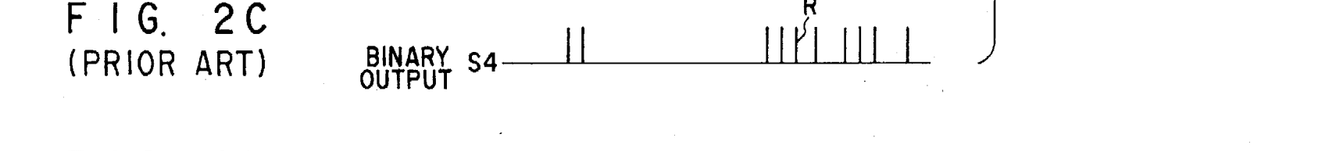
FIG. 2C shows a waveform (pulse) obtained when the servo signal in the outermost tracks is output from a pulse decoder.
Figure 2D:
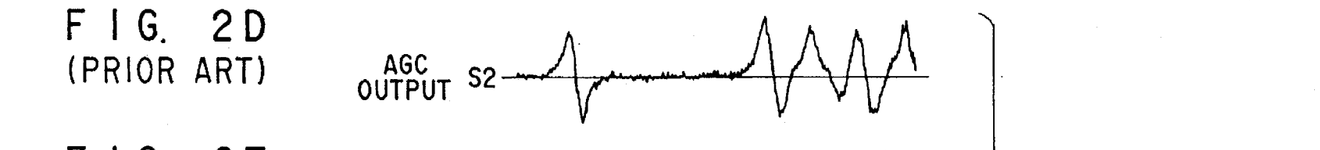
FIG. 2D shows a waveform obtained when a servo signal in an innermost tracks is output from the AGC amplifier.
Figure 2E:
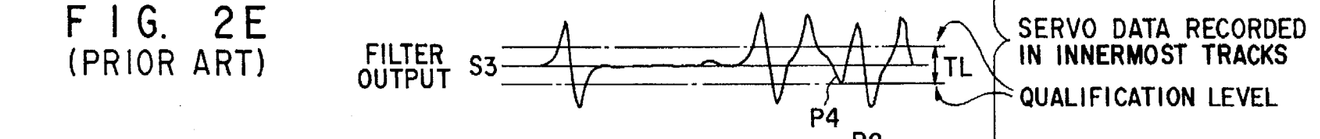
FIG. 2E shows a waveform obtained when the servo signal in the innermost tracks is output from the low-pass filter.
Figure 2F:
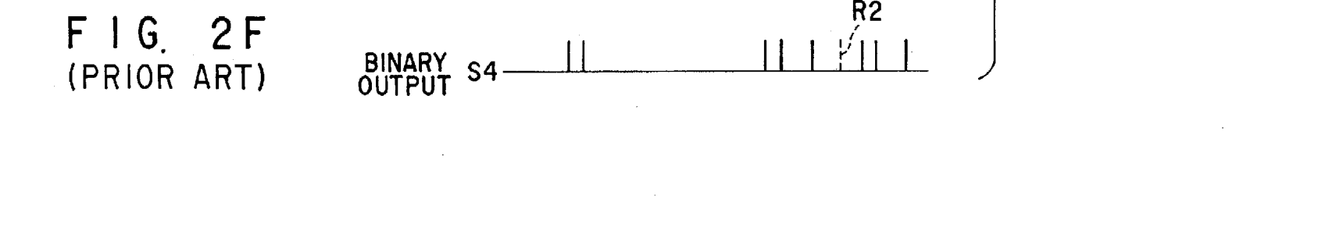
FIG. 2F shows a waveform (pulse) obtained when the servo signal in the innermost tracks is output from the pulse decoder.

Timing charts representing the relationship between an AGC output waveform, a filter output waveform, and a binary output pulse obtained in a read operation for servo data in the conventional magnetic disk system will be described below with reference to FIGS. 2A to 2F. Note that FIGS. 2A to 2C show timing charts obtained in a read operation for servo data in the outermost tracks of a disk, and FIGS. 2D to 2F show timing charts obtained in a read operation for servo data in the innermost tracks of the disk.

More specifically, since peak waveforms corresponding to the flux reversal portions of a servo signal generated when the servo data in the outermost tracks of the disk is read out are sharp, the integral-type gain detector 6 requires a short time to integrate the servo signal, and the level of the gain control signal S5 fed back to the AGC amplifier 3 is lowered.

Therefore, the AGC amplifier 3 adjusts the level of the readback servo signal S1 in the outermost tracks of the disk while increasing an amplification gain to raise, to a predetermined signal level, the level of the low-level gain control signal S5 fed back from the gain detector 6. In this manner, the servo signal S2, having a level adjusted by the AGC amplifier 3, on the outermost tracks of the disk and the servo signal S3 output through the filter 4 have waveforms each having a sharp peak portion and a large amplitude.

The AGC amplifier 3 also adjusts the level of the readback servo signal S1 in the innermost tracks of the disk while decreasing an amplification gain to lower, to a predetermined signal level, the level of the high-level gain control signal S5 fed back from the gain detector 6. In this manner, the servo signal S2, having a level adjusted by the AGC amplifier 3, on the inner-most tracks of the disk and the servo signal S3 output through the filter 4 have waveforms each having a dull peak portion and a small amplitude.

For this reason, when the readback servo signal S3 is to be binarized by the pulse decoder 5 in accordance with the predetermined qualification level TL, the binary detection margin of the servo signal S3, in which the peak waveforms and sharp and have large amplitudes, in the outermost tracks and the binary detection margin of the servo signal S3, in which the peak waveforms are dull and have small amplitudes, in the innermost tracks are considerably different from each other, and not all pulses appearing in the read signal are true (and some pulses may be missing), thereby causing erroneous recognition of a positioning address.

Figure 3A:
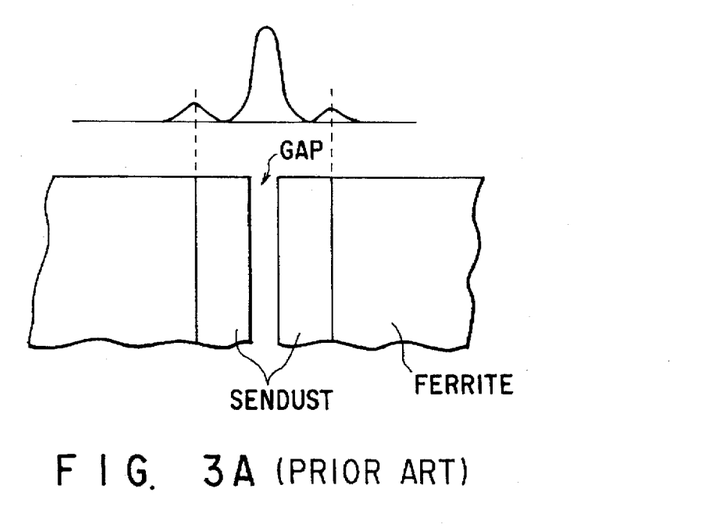

When an MIG (Metal In Gap) head is applied as the magnetic head 2, a pseudo-gap may cause inconvenience in a signal detected by the magnetic head 2. In a general MIG head, in order to improve write capability, a film consisting of a material such as sendust having a high Bs (saturation flux density) is attached by sputtering to the gap portion of a core consisting of ferrite. However, in such an MIG head, when a magnetic gap is formed in the boundary portion between the ferrite and the sendust, this gap operates as a gap equivalent to the gap portion of the MIG head. The gap is called a pseudo-gap. In a readback signal such as a servo signal, other signals are generated, by the pseudo-gap, on both the sides (front and rear sides) of a proper signal read from the gap portion. A portion near the gap portion of the MIG head and a signal generated by the pseudo-gap are shown in FIG. 3A. Note that such a signal generated by the pseudo-gap is determined by the length (thickness) of the high Bs film.

Figure 3B:
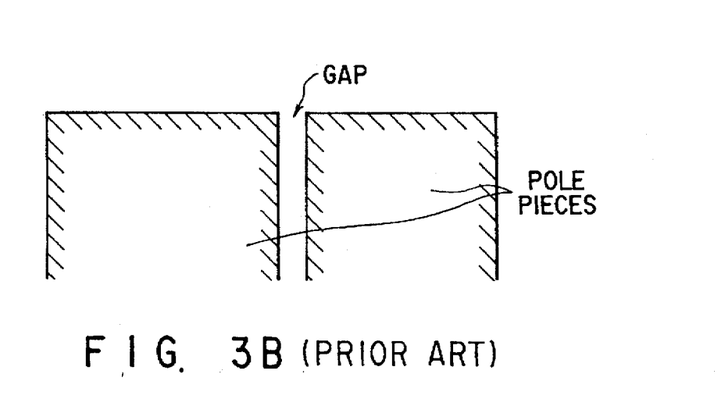

When a thin film head is applied as the magnetic head 2, a contour effect causes inconvenience in a signal detected by the magnetic head 2. In this case, pole pieces which form the gap portion of the thin film head are shown in FIG. 3B. In a general thin film head, the lengths of poles which form a gap portion are as short as several μm. In the poles of the thin film head, a signal is also loaded from edges located at a position opposing edges which form the gap portion of the head. This phenomenon is called a contour effect. In a readback signal, the contour effect generates undershoots on both the sides (front and rear sides) of a proper signal loaded from the gap portion. Note that positions at which the undershoots are generated are determined by the lengths of the poles. The thin film head and contour effect described above are described in detail in 4.1 Types of recording element and 4.5 Head Application in Chapter 4 Recording head in Magnetic recording Vol. 1, C. Denis Mee and Eric D. Daniel, McGrow Hill Book Company, 1987.

As described above, when the MIG head or thin film head is applied as the magnetic head 2, signal waveforms generated by a read operation for servo data include peak waveforms generated by the proper read operation and small peak waveforms generated by the pseudo-gap or contour effect.

For this reason, when servo data in the outermost tracks of a disk is to be read back, as shown in FIG. 2A, small peak waveforms P1, P2, and P3 may be generated by the above causes. The small peak waveforms generated at this time may include a small peak waveform which reaches the binary qualification level TL as indicated by P3' in FIG. 2B. In this case, as indicated by R1 in FIG. 2C, an unnecessary binary pulse is accidentally generated.

In addition, when servo data in the innermost tracks of the disk is read back, as shown in FIGS. 2D and 2E, the amplitude of the proper peak waveform is reduced by the small peak waveforms generated by the above causes, and the proper peak waveform does not reach the binary qualification level. In this case, as indicated by an arrow R2 in FIG. 2F, a necessary binary pulse is omitted.

Therefore, in a conventional servo signal detecting apparatus in a magnetic disk system, the signal waveforms of a servo signal S3 supplied to the pulse decoder 5 in a read operation for servo data are different in the peripheral and innermost tracks of the disk. For this reason, a variation in binary detection margin is large. When the MIG head is used, the signal waveforms of the servo signal S3 include excessive small peak waveforms due to a pseudo-gap. When the thin film head is used, the signal waveforms of the servo signal S3 include excessive small waveforms due to a contour effect. For this reason, not all pulses appearing in the read signal are true (and some missing some pulse may be missing), thereby causing erroneous recognition of a positioning address.

SUMMARY OF THE INVENTION

It is an object of the present invention to provide a magnetic disk system having a servo signal detecting function capable of correctly recognizing a positioning address without accidental generation or omission of a binary pulse in a read operation for servo data recorded in the entire area of the peripheral and innermost tracks of a magnetic disk in synchronism with a write period having a predetermined frequency, even if servo signal waveforms in the outermost tracks are different from those in the innermost tracks or excessive peak waveforms are present by using a thin film head or an MIG head.

According to a first aspect of the present invention, there is provided a magnetic disk system comprising: a magnetic disk having servo data recorded in an entire area of the magnetic disk in synchronism with a predetermined write period; a magnetic head for magnetically reading back the servo data recorded on the magnetic disk and outputting the servo data as a servo signal; a filter for shaping a waveform of the servo signal output from the magnetic head; a pulse decoder for detecting a peak waveform of the servo signal having a waveform shaped by the filter to binarize the servo signal; means for detecting a position of the magnetic head on the magnetic disk on the basis of the servo signal binarized by the pulse decoder; and setting means, having a plurality of filter characteristics for determining a characteristic of the filter, for setting one of the plurality of filter characteristics in the filter.

According to a second aspect of the present invention, there is provided a servo signal detecting method in a magnetic disk system including a magnetic disk having servo data recorded in an entire area of the magnetic disk in synchronism with a predetermined write period and a magnetic head for magnetically reading back the servo data recorded on the magnetic disk and outputting the servo data as a servo signal, comprising the steps of: a) shaping a waveform of the servo signal output from the magnetic head; b) detecting a peak waveform of the servo signal having a waveform shaped in the step a) to binarize the servo signal; c) detecting a position of the magnetic head on the magnetic disk on the basis of the servo signal binarized in the step b); and d) controlling a waveform shaping characteristic in the step a).

With the above arrangement or method, a variable filter characteristic having at least two characteristic values is variably set by the setting unit for setting the filter characteristic in accordance with, e.g., movement of the magnetic head in the radial direction of the magnetic disk. Therefore, a servo signal having waveforms different in the peripheral and innermost tracks of the disk is uniformed when the servo signal is supplied to the pulse decoder.

According to a third aspect of the present invention, there is provided a magnetic disk system comprising: a magnetic disk having servo data recorded in an entire area of the magnetic disk in synchronism with a predetermined write period; a magnetic head for magnetically reading back the servo data recorded on the magnetic disk and outputting the servo data as a servo signal; a pulse decoder for detecting a peak waveform of the servo signal output from the magnetic head to binarize the servo signal; means for detecting a position of the magnetic head on the magnetic disk on the basis of the servo signal binarized by the pulse decoder; and setting means, having a plurality of filter characteristics, for setting one of the plurality of filter characteristics in the pulse decoder.

According to a fourth aspect of the present invention, there is provided a servo signal detecting method in a magnetic disk system including a magnetic disk having servo data recorded in an entire area of the magnetic disk in synchronism with a predetermined write period and a magnetic head for magnetically reading back the servo data recorded on the magnetic disk and outputting the servo data as a servo signal, comprising the steps of: a) detecting a peak waveform of the servo signal output from the magnetic head and binarizing the servo signal in accordance with a binary qualification level; b) detecting a position of the magnetic head on the magnetic disk on the basis of the servo signal binarized in the step a); and c) controlling the binary qualification level.

With the above arrangement or method, at least two binary qualification levels switched by the setting unit for setting the binary qualification levels are switched in accordance with, e.g., movement of the magnetic head in the radial direction of the magnetic disk. For this reason, the peak waveforms, of the servo signal, which are different in the peripheral and innermost tracks of the disk are correctly binarized.

According to a fifth aspect of the present invention, there is provided a magnetic disk system comprising: a magnetic disk having servo data recorded in an entire area of the magnetic disk in synchronism with a predetermined write period; a magnetic head for magnetically reading back the servo data recorded on the magnetic disk and outputting the servo data as a servo signal; a filter for shaping a waveform of the servo signal output from the magnetic head; a pulse decoder for detecting a peak waveform of the servo signal having a waveform shaped by the filter to binarize the servo signal; means for detecting a position of the magnetic head on the magnetic disk on the basis of the servo signal binarized by the pulse decoder; first setting means, having a plurality of filter characteristics for determining a characteristic of the filter, for setting one of the plurality of filter characteristics in the filter; and second setting means, having a plurality of binary qualification levels of the pulse decoder, for setting one of the plurality of binary qualification levels in the pulse decoder.

In this system, the first setting means includes means for setting one of the plurality of filter characteristics in the filter in accordance with a recording density changed depending on movement of the magnetic head in a radial direction of the magnetic disk, and the second setting means includes means for setting one of the plurality of qualification levels in the pulse decoder in accordance with a recording density changed depending on movement of the magnetic head in a radial direction of the magnetic disk.

According to a sixth aspect of the present invention, there is provided a servo signal detecting method in a magnetic disk system including a magnetic disk having servo data recorded in an entire area of the magnetic disk in synchronism with a predetermined write period and a magnetic head for magnetically reading back the servo data recorded on the magnetic disk and outputting the servo data as a servo signal, comprising the steps of: a) shaping a waveform of the servo signal output from the magnetic head; b) detecting a peak waveform of the servo signal having the waveform shaped in the step a) and binarizing the servo signal in accordance with a binary qualification level; c) detecting a position of the magnetic head on the magnetic disk on the basis of the servo signal binarized in the step b); and d) controlling a waveform shaping characteristic in the step a); and e) controlling the binary qualification level.

With the arrangement or method, the filter characteristic having at least two characteristic values and variably set by the setting unit for setting the filter characteristic and the at least two binary qualification levels switched by the setting unit for setting the binary qualification levels are variably set and switched in accordance with, e.g., movement of the magnetic head in the radial direction of the magnetic disk. For this reason, the servo signal having waveforms different in the peripheral and innermost tracks of the disk is uniformed when the servo signal is supplied to the pulse decoder, and the peak waveforms of the servo signal are correctly binarized.

Therefore, in a readback operation for servo data recorded in the entire area of the peripheral and innermost tracks of the magnetic disk, even if servo signal waveforms are different in the peripheral and innermost tracks or excessive peak waveforms are present by using a thin film head or an MIG head, a positioning address can be correctly recognized without accidental generation or omission of a binary pulse.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 2A to 2F are timing charts showing the various waveforms of a servo signal in the arrangement, shown in FIG. 1, for detecting a servo signal, in which

FIGS. 3A and 3B are views for explaining portions near the gap portions of various magnetic heads, in which FIG. 3A shows a portion near the gap portion of an MIG head and FIG. 3B shows a portion near the gap portion of a thin film head;

FIGS. 9A to 9F are timing charts showing the various waveforms of a servo signal in the arrangement, shown in FIG. 4, for detecting a servo signal, in which

DETAILED DESCRIPTION OF THE PREFERRED EMBODIMENT

A magnetic disk system according to an embodiment of the present invention will be described below with reference to the accompanying drawings.

Figure 4:
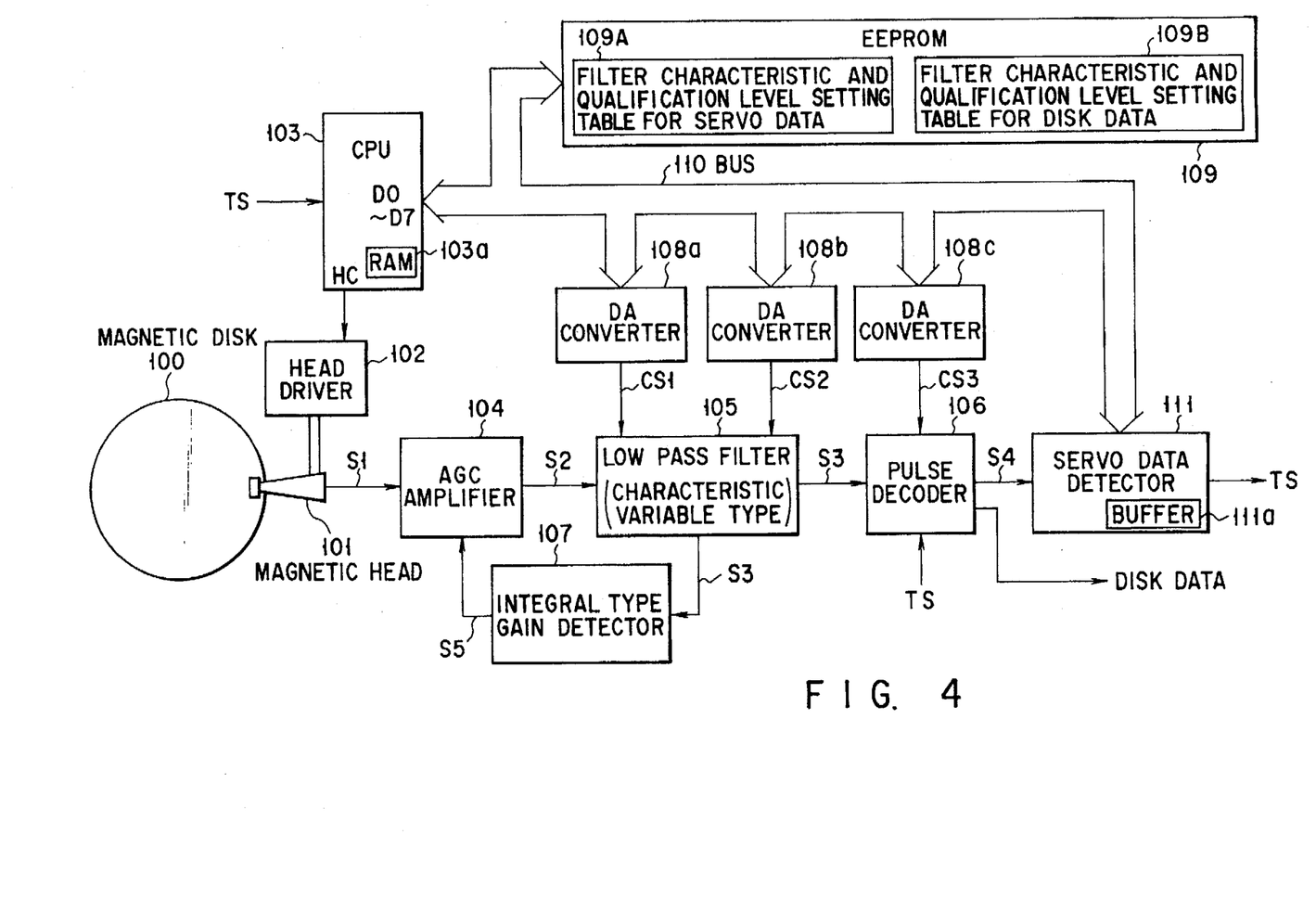
FIG. 4 is a block diagram showing an arrangement for detecting a servo signal in a magnetic disk system according to an embodiment of the present invention.

An arrangement for detecting a servo signal in the magnetic disk system of the present invention is shown in FIG. 4.

On a magnetic disk 100, as a recording area for various data, for example, a plurality of tracks each having a predetermined width are assigned in the radial direction of the magnetic disk 100. In each track, sectors are assigned at predetermined intervals in circumferential direction. Servo data representing a track or sector position is recorded in the track or sector.

The servo data are recorded on the magnetic disk 100 as a flux reversal pattern obtained by causing a track or sector address expressed by binary numbers to correspond to changes in data of "1" and "0". The flux reversal pattern is recorded in all tracks from the peripheral track to the central track in synchronism with a write period having a predetermined frequency.

As a magnetic head 101, for example, an MIG head or a thin film head is applied. A head driver 102 constituted by a motor, a carriage, and the like drives the magnetic head 101 in the radial (track) direction on the magnetic disk 100 rotated at a predetermined speed. A head drive signal HC, output from a CPU 103, for moving and positioning the magnetic head 101 at a target address in accordance with a track or sector address recognized on the basis of servo data read back from the magnetic disk 100 is supplied to the head driver 102.

Servo data recorded as a flux reversal pattern is read back by the magnetic head 101, output as an analog servo signal S1, and supplied to an AGC amplifier 104.

This AGC amplifier 104 attenuates or amplifies the analog servo signal S1 supplied from the magnetic head 101 and adjusts the level of the analog servo signal S1 to a predetermined signal level. A servo signal S2 having a level adjusted by the AGC amplifier 104 is supplied to a characteristic variable type low-pass filter 105.

The characteristic variable type low-pass filter 105 can variably set the setting value of a cutoff frequency fc and the setting value of a boost amount. A servo signal S3 from which a specific frequency component is removed in accordance with the cutoff frequency fc and the boost amount set by the low-pass filter 105 and which is amplified/attenuated in accordance with the cutoff frequency fc and the boost amount is supplied to a binarization circuit (pulse decoder) 106.

Peak points corresponding to flux reversal read portions of the servo signal S3 supplied through the low-pass filter 105 are detected by the pulse decoder 106 in accordance with a qualification level TL which is variably set in advance, and each peak point is output as a binary pulse S4. This binarized pulse S4 is supplied to a servo data detector 111. This servo data detector 111 detects servo data recorded on the magnetic disk 100 as a specific pattern and decodes the data to obtain the positioning address of the magnetic head 101 representing a track or a sector. The servo data detector 111 has a buffer 111a and causes the buffer 111a to store the address obtained by the decoder. When the CPU 103 informs the servo data detector 111 that the magnetic head 101 is located on a target track, the servo data detector 111 outputs a timing signal TS representing a timing of switching between servo data (ID data) and disk data for storing information processed or transmitted/received in the magnetic disk system and a host system. The timing signal TS is supplied to the CPU 103 and the pulse decoder 106. The pulse decoder 106 sends only a binary pulse signal corresponding to the disk data to a decoder (not shown) or the like in accordance with the timing signal TS. In this manner, the desired disk data is demodulated by the decoder and recognized.

The servo signal S3 from which the specific frequency component is removed by the low-pass filter 105 and which is amplified or attenuated by the low-pass filter 105 is supplied to the pulse decoder 106 and an integral-type gain detector 107, and the signal level of the servo signal S3 is detected. The servo signal S3 is fed back to the AGC amplifier 104 as a gain control signal S5. The AGC amplifier 104 adjusts an amplification gain for the servo signal S1 read back from the magnetic head 101 such that the level of the gain control signal S5 is set to be a predetermined signal level, thereby adjusting the level of the servo signal S2 output to the low-pass filter 105 to a predetermined level.

In this case, a flux reversal pattern recorded on the magnetic disk 100 as servo data is recorded, in synchronism with a predetermined write frequency, at any position in the innermost and outermost tracks of the magnetic disk 100 rotated at a predetermined speed. For this reason, the data recording density is low in the outermost tracks of the magnetic disk 100 and high in the innermost tracks of the magnetic disk 100. More specifically, the interval between flux reversal patterns serving as servo data is larger in the outermost tracks of the magnetic disk 100 than in the innermost tracks. For this reason, when the servo data is read back by the magnetic head 101, peak waveforms corresponding to the flux reversal portions of the analog servo signal S1 output from the magnetic head 101 are sharp and approximate to independent waveforms in the outermost tracks. In the innermost tracks, waveforms are interfered with each other, and the waveforms are dull.

In addition, a pseudo-gap is formed when an MIG head is applied as the magnetic head 101, and a contour effect occurs when a thin film head is applied as the magnetic head 101. For this reason, the analog servo signal S1 output from the magnetic head 101 includes peak waveforms corresponding to individual flux reversal portions and small peak waveforms.

The setting value of the cutoff frequency fc and the setting value of the boost amount in the low-pass filter 105 are variably set by a cutoff control signal CS1 and a boost control signal CS2 respectively supplied from DA converters 108a and 108b. The setting data of the cutoff frequency fc and the boost amount are selectively determined by the CPU 103 in accordance with a filter characteristic and qualification level setting table 109A for servo data stored in an EEPROM (electrically erasable and programmable read-only memory) 109 in advance, and the setting data are respectively transferred to the DA converters 108a and 108b through a data bus (BUS) 110.

The setting value of the binary qualification level TL in the pulse decoder 106 is variably set by a qualification level control signal CS3 supplied from a corresponding DA converter 108c. The setting data of the qualification level TL is selectively determined by the CPU 103 together with the setting data of the cutoff frequency fc and the boost amount in accordance with the filter characteristic and qualification level setting table 109A stored in the EEPROM 109 in advance. The setting data of the qualification level TL is transferred to the DA converter 108c through the data bus (BUS) 110.

Figure 5:
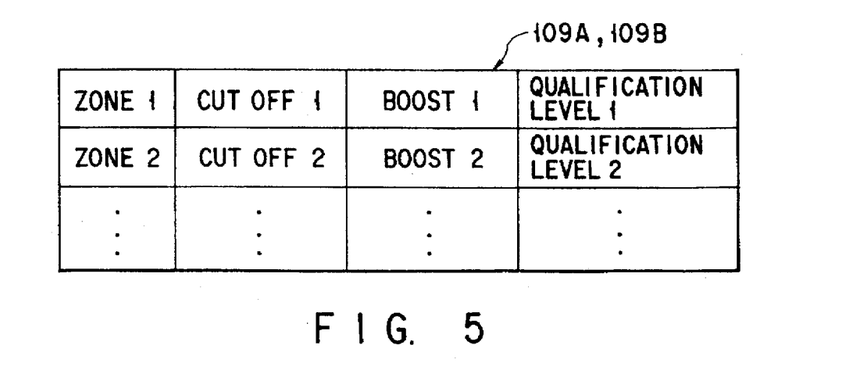
FIG. 5 is a view for explaining a filter characteristic and qualification level setting table for servo data shown in FIG. 4.

In the EEPROM 109, in addition to the filter characteristic and qualification level setting table 109A for servo data, a filter characteristic and qualification level setting table 109B for disk data is set. The filter characteristic and qualification level setting table 109A for servo data divides the magnetic disk 100 into predetermined zones in the radial direction and stores filter characteristics and qualification levels corresponding to the respective zones, as shown in FIG. 5. More specifically, a cutoff frequency fc, a boost amount, and a qualification level TL are set and stored for each zone, and the intertrack movement of the magnetic head 101 in the radial direction of the magnetic disk 100 is determined on the basis of a head drive signal HC output from the CPU 103 to the head driver 102. In this case, the setting values of the cutoff frequency fc, the boost amount, and the qualification level TL depending on the zone corresponding to the target track are read out and transferred to the DA converters 108a, 108b, and 108c, respectively. In this embodiment, the magnetic disk 100 is divided into three zones in the table 109A. The filter characteristic and qualification level setting table 109B for disk data, like the table shown in FIG. 5, stores a filter characteristic and a qualification level for each zone. However, in the table 109B, zones different from those set in the table 109A are set. That is, although the magnetic disk 100 is divided into three zones in the table 109A, the magnetic disk 100 is divided into, e.g., ten zones in the table 109B.

With the above arrangement, the cutoff frequency fc and boost amount of the servo signal S2 in the low-pass filter 105 and the binary qualification level TL of the servo signal S3 in the pulse decoder 106 are variably set in accordance with interzone movement of the magnetic head 101 with respect to the magnetic disk 100.

In this case, the cutoff frequency fc corresponding to a peripheral zone is set to be lower than the cutoff frequency fc of a filter 4 arranged to only remove high-frequency noise in the conventional system (FIG. 1) for detecting a servo signal, and the cutoff frequency fc corresponding to a central zone is set to be higher than the cut off frequency fc of the filter 4.

The boost amount corresponding to the peripheral zone is set to be small, and the boost amount corresponding to the central zone is set to be large especially on the high-frequency side of a pass frequency range.

More specifically, in the servo signal S1 recorded in the outermost tracks and having sharp peak waveforms corresponding to the read portions of a flux reversal pattern in servo data, the sharp peak waveforms are dulled in accordance with a filter characteristic defined by a relatively low cutoff frequency fc and a small boost amount, and accidental generation of independent small peak waveforms generated by the influence of a pseudo-gap or a contour effect is suppressed.

In the servo signal S1 recorded in the innermost tracks and having dull peak waveforms corresponding to the read portions of a flux reversal pattern in servo data, the dull peak waveforms and peak waveforms each having an amplitude reduced by the influence of a contour effect are raised and sharpened in accordance with a filter characteristic defined by a high cutoff frequency fc and a boost amount which is large on a high-frequency side.

In addition, the binary qualification level TL corresponding to the peripheral zone is set to be higher than the qualification level TL of the pulse decoder 5 in a conventional arrangement (FIG. 1) for detecting a servo signal, and the binary qualification level TL corresponding to the central zone is set to be a low qualification level.

More specifically, in the servo signal S1 in the outermost tracks, wherein the peak waveform corresponding to the read portions of a flux reversal pattern in servo data are sharp, and independent small peak waveforms generated by the influence of the contour effect tend to be binarized, the waveforms are dulled by the low-pass filter 105, and proper peak waveforms are correctly binarized in accordance with the high qualification level TL. On the other hand, in the servo signal S1 in the innermost tracks, wherein the peak waveforms corresponding to the read portions of a flux reversal pattern in servo data is dull, and peak waveforms each having an amplitude reduced by the influence of a pseudo-gap or a contour effect tend not to be binarized, a signal waveform is sharpened by the low-pass filter 105, and necessary peak waveforms are reliably binarized in accordance with a low qualification level TL.

Figure 6:
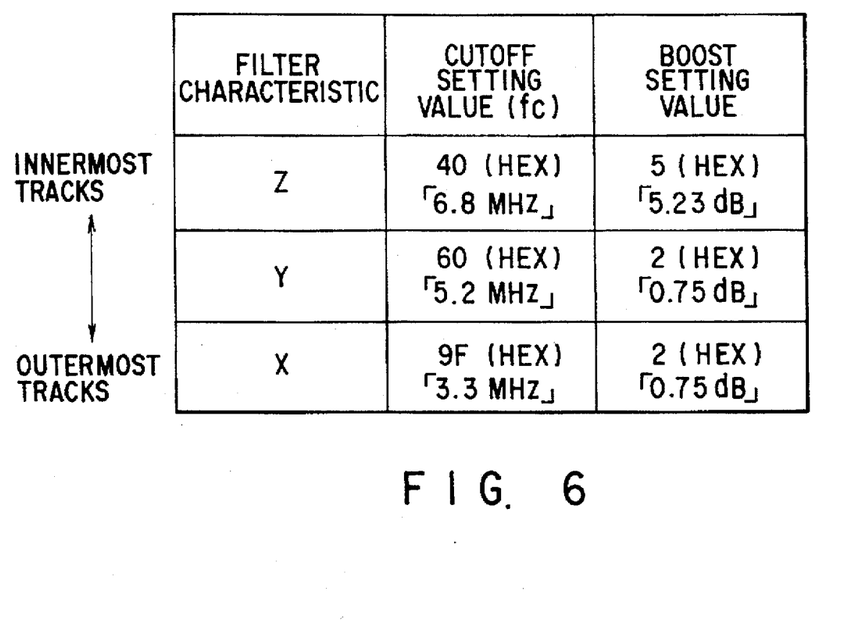
FIG. 6 is a view for explaining a filter characteristic and qualification level setting table for servo data shown in FIGS. 4 and 5.
Figure 7:
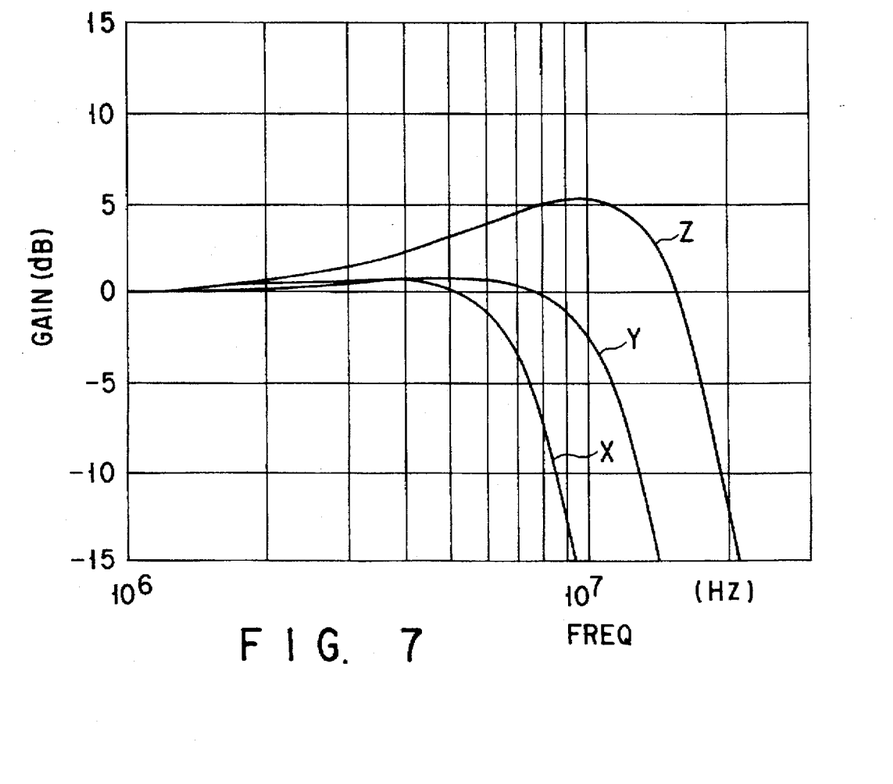
FIG. 7 is a graph showing the relationship between a frequency and a gain in a filter controlled on the basis of each filter characteristic data shown in FIG. 6.

An example of filter characteristic setting table stored in the EEPROM 109 of the magnetic disk system is shown in FIG. 6. This filter characteristic setting table in made when a highest frequency of the servo data is 5 MHz. The variable states of a filter characteristic depending on the table 109A for servo data are shown in FIG. 7.

In this case, the variable zone for the filter characteristic in this embodiment is divided into a peripheral zone, an intermediate zone, and a central zone. A filter characteristic X defined by a cutoff frequency fc of "3.3 MHz" and a boost amount of "0.75 dB", a filter characteristic Y defined by a cutoff frequency fc of "5.2 MHz" and a boost amount of "0.75 dB", and a filter characteristic Z defined by a cutoff frequency fc of "6.8 MHz" and a boost amount of "5.23 dB" are selectively set by the CPU 103 in the peripheral zone, the intermediate zone, and the central zone, respectively.

Figure 8:
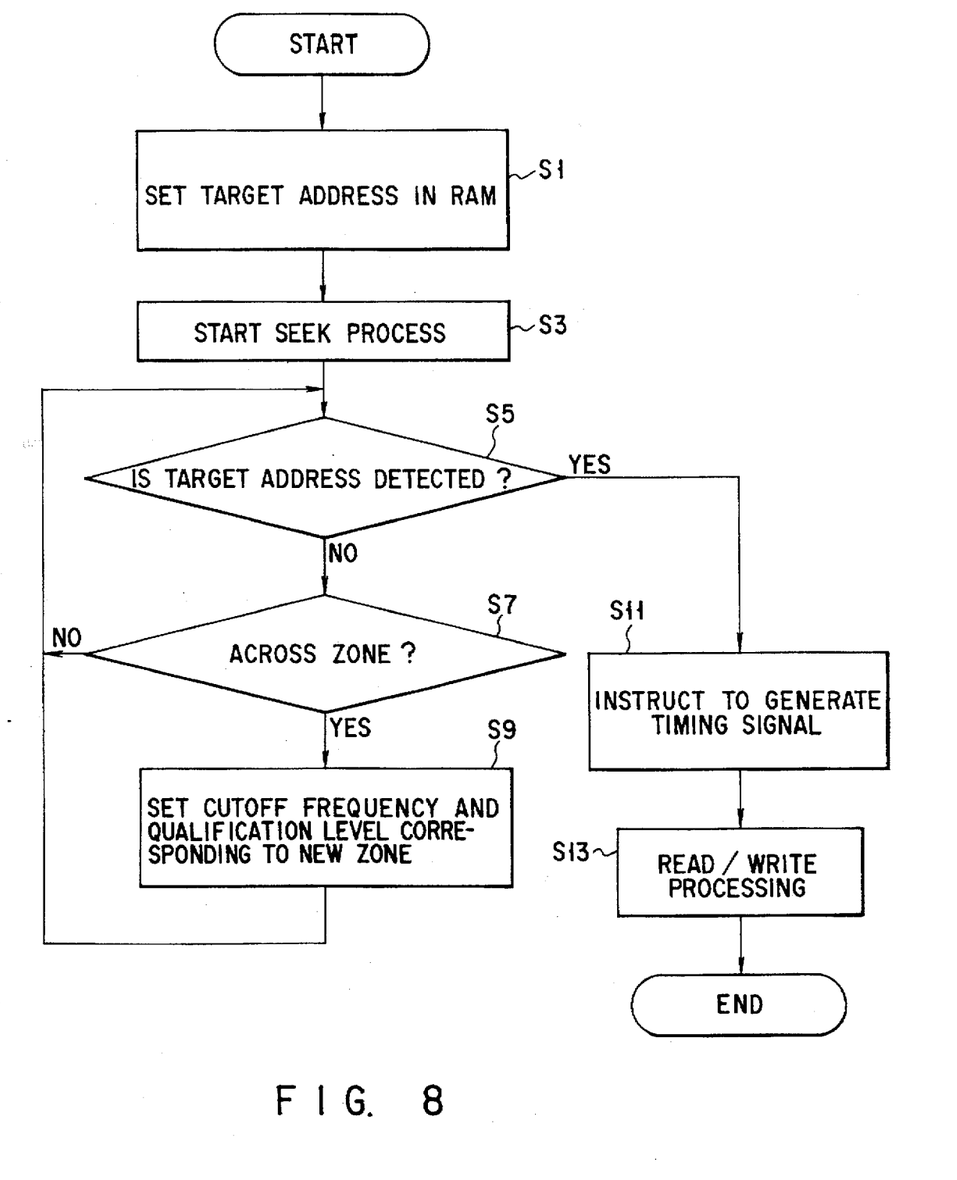
FIG. 8 is a flow chart for explaining control of a low-pass filter and a pulse decoder when the magnetic head is controlled to be located up to a desired position on the magnetic disk in the magnetic disk system shown in FIG. 4.

Operations performed until the magnetic head is located at a target address in the magnetic disk system in accordance with a command issued by a host system connected to the magnetic disk system will be described below with reference to the flow chart in FIG. 8.

The CPU 103 stores a target track address and a target sector address in a RAM 103a arranged in the CPU 103 in accordance with a command, e.g., a write or read command, issued by the host system (step S1). At this time, in the magnetic disk system, the low-pass filter 105 and the pulse decoder 106 are constituted such that a filter characteristic and a qualification level corresponding to a position (zone) of the magnetic head 101 on the magnetic disk 100 are set in the low-pass filter 105 and the pulse decoder 106 in advance. For example, when positioning control is performed in accordance with a previously issued command, the filter characteristic and qualification level, of the table 109A, corresponding to the positioned zone are stored in a predetermined area of the RAM 103a. In this manner, in the CPU 103, when a new command is issued, and the magnetic head 101 must be moved, a target address is set in the RAM 103a. In addition, the filter characteristic and qualification level stored in the predetermined area of the RAM 103a are set in the low-pass filter 105 and the pulse decoder 106.

Thereafter, the CPU 103 outputs the head drive signal HC to the head driver 102 to move the magnetic head 101 toward the target address, and starts a seek process (step S3). In addition, the CPU 103 compares a track address representing the position of the magnetic head 101 and written in the buffer 111a of the servo data detector 111 at any time with the target address stored in the RAM 103a to determine whether the target address is detected (step S5).

In this case, if the target address is not detected (NO in step S5), it is determined whether the magnetic head 101 is moved across zones (step S7). This determination is performed by checking whether the track address written in the buffer 111a currently falls within the range of the zone corresponding to the filter characteristic and qualification level set in the low-pass filter 105 and the pulse decoder 106. In this case, the address written in the buffer 111a does not exceed the address range of the zone in use (NO in step S7), the flow returns to step S5 to determine again whether the target address is detected.

When the address written in the buffer 111a exceeds the address range of the zone in use (YES in step S7), the CPU 103 sets a filter characteristic and a qualification level corresponding to a zone including the address written in the buffer 111a in the low-pass filter 105 and the pulse decoder 106. More specifically, the CPU 103 uses the EEPROM 109 to search the zone defined as a zone including the address written in the buffer 111a. When the corresponding zone is found, the CPU 103 sends the filter characteristic and qualification level corresponding to the zone to the DA converters 108a, 108b, and 108c through the data bus 110. The filter characteristic and qualification level sent as digital data are converted by the DA converters into analog data and sent to the low-pass filter 105 and the pulse decoder 106. With the above processes, a new filter characteristic and a new qualification level are set in the low-pass filter 105 and the pulse decoder 106, and a process suitable for detecting a servo signal is performed on the basis of these values. Thereafter, the flow returns to step S5, and the CPU 103 determines whether the target address is loaded in the buffer 111a.

When the target address is detected in step S5, the CPU 103 instructs the servo data detector 111 to output the timing signal TS representing the read timings of servo and disk data (step S11). After the servo data detector 111 receives this instruction, the servo data detector 111 keeps outputting the timing signal TS until a process for the data at the target address is completed. The timing signal TS output from the servo data detector 111 is sent to the CPU 103 and the pulse decoder 106 through a specific signal line.

The CPU 103 controls a filter characteristic and a qualification level, set in the low-pass filter 105 and the pulse decoder 106, in accordance with the timing signal TS. More specifically, when the timing signal TS represents a timing for loading servo data, the CPU 103 reads out a filter characteristic and a qualification level for detecting the servo signal from the filter characteristic and qualification level setting table 109A for detecting a servo signal, and the filter characteristic and qualification level are sent to the DA converters 108a, 108b, and 108c. In addition, when the timing signal TS represents a timing for loading disk data, the CPU 103 reads out, from the filter characteristic and qualification level setting table 109B for disk data, a filter characteristic and a qualification level for detecting a signal representing the disk data, and the filter characteristic and qualification level are sent to the DA converters 108a, 108b, and 108c. When the timing signal TS represents a timing for loading disk data, a filter characteristic and a qualification level for detecting a signal representing the disk data is read out from the table 109B and sent to the DA converters 108a, 108b, and 108c. In order to increase the speed of the process of setting the filter characteristic and qualification level in the low-pass filter 105 and the pulse decoder 106 in accordance with the timing signal TS, after a target address is detected in step S5, the filter characteristics and qualification levels, corresponding to a zone including this address, for the servo and disk data may be read out from the tables 109A and 109B and stored in predetermined areas of the RAM 103a, respectively.

In the magnetic disk system, servo data and disk data are read back on the basis of the filter characteristics and qualification levels set as described above, and a process corresponding to a command issued by the host system is executed.

An operation for detecting a servo signal will be described below with reference to FIGS. 9A to 9F.

Figure 9A:
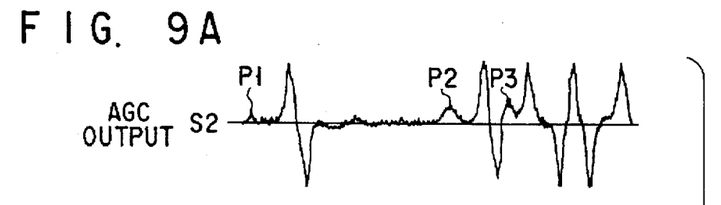
FIG. 9A shows a waveform obtained when a servo signal in an outermost tracks is output from an AGC amplifier.
Figure 9B:
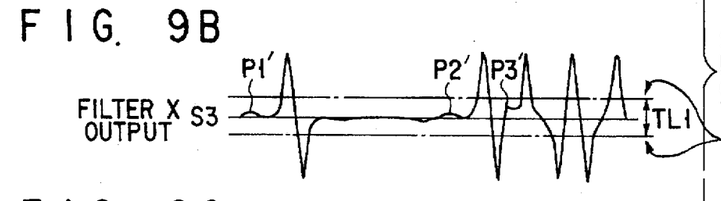
FIG. 9B shows a waveform obtained when the servo signal in the outermost tracks is output from a low-pass filter.
Figure 9C:
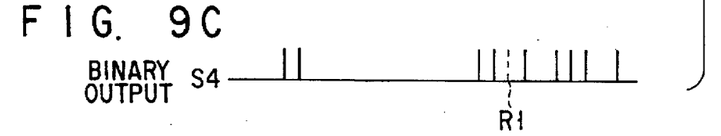
FIG. 9C shows a waveform (pulse) obtained when the servo signal in the outermost tracks is output from a pulse decoder.
Figure 9D:
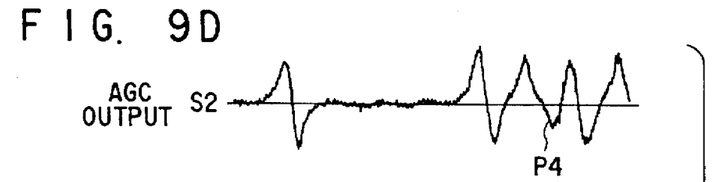
FIG. 9D shows a waveform obtained when a servo signal in an innermost tracks is output from the AGC amplifier.
Figure 9E:
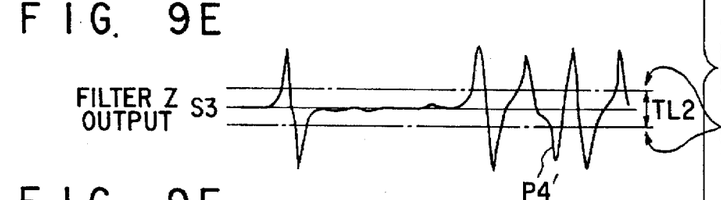
FIG. 9E shows a waveform obtained when the servo signal in the innermost tracks is output from the low-pass filter.
Figure 9F:
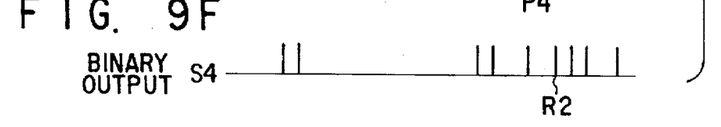
FIG. 9F shows a waveform (pulse) obtained when the servo signal in the innermost tracks is output from the pulse decoder.

FIGS. 9A to 9F are timing charts showing the relationship between an AGC output waveform, a filter output waveform, and a binary output pulse which are generated in the detecting operation for a servo signal in the magnetic disk system. FIGS. 9A to 9C are timing charts obtained in a read operation for servo data in the outermost tracks of the disk, and FIGS. 9D to 9F are timing charts obtained in a read operation for servo data in the innermost tracks of the disk.

More specifically, the servo data recorded in the outermost tracks of the magnetic disk 100 has flux reversal patterns arranged at large intervals. For this reason, when the servo data in the outermost tracks of the disk is read back by the magnetic head (MIG head or thin film head) 101, and the level of the servo data is adjusted through the AGC amplifier 104, peak waveforms corresponding to the flux reversal portions of the servo signal S2 and small peak waveforms P1, P2, and P3 generated by the influence of a pseudo-gap or a contour effect are sharpened.

At this time, a state in which the magnetic head 101 is positioned in the peripheral zone of the magnetic disk 100 when a highest frequency of the servo data is 5 MHz is determined by the CPU 103 in accordance with a head drive signal from the CPU 103. In this case, on the basis of the filter characteristic and qualification level setting table 109A stored in the EEPROM 109 in advance, the filter characteristic of the low-pass filter 105 is set to be the characteristic X (FIGS. 6 and 7) defined by a cutoff frequency fc of "3.3 MHz" and a boost amount of "0.75 dB", and the binary qualification level TL of the pulse decoder 106 is set to be a high qualification level TL1.

When servo information recorded in the peripheral zone of the magnetic disk 100 is to be read back, the cutoff frequency fc of the low-pass filter 105 is set to be lower than the cutoff frequency fc of the filter 4 arranged to only remove high-frequency noise in, e.g., a conventional magnetic disk system (FIG. 1), and a boost amount is set to be small. At the same time, the binary qualification level TL of the pulse decoder 106 is set to be higher than the qualification level TL of the pulse decoder 5 in, e.g., the conventional magnetic disk system (FIG. 1).

In this manner, the peak waveforms corresponding to the flux reversal portions of the servo signal S3 recorded on the outermost tracks of the disk and output through the low-pass filter 105 are dulled as a whole, and, as indicated by P1', P2', and P3' in FIG. 9B, accidental generation of independent small peak waveforms generated by the influence of a pseudo-gap or a contour effect is suppressed. When the servo signal S3 of the servo data recorded in the outermost tracks of the disk and based on the filter characteristic X is binarized by the pulse decoder 106 in accordance with the high qualification level TL1, for example, a small peak waveform P3' generated by the influence of the pseudo-gap or contour effect does not cross the binary qualification level TL1, and, as indicated by R1 in FIG. 9C, an excessive binary pulse is prevented from being accidentally generated (not all pulses appearing in the read signal are true and some pulses may be missing). Therefore, only the proper peak waveforms corresponding to the flux reversal portions are correctly binarized.

The servo data recorded in the innermost tracks of the magnetic disk 100 has flux reversal patterns arranged at small intervals. For this reason, when the servo data in the innermost tracks of the disk is read back by the magnetic head (MIG head or thin film head) 101, and the level of the servo data is adjusted through the AGC amplifier 104, the peak waveforms corresponding to the flux reversal portions of the servo signal S2 are dulled by interfering the peak waveforms with each other, and a small peak waveform P4 having an amplitude reduced by the influence of a pseudo-gap and a contour effect is also present.

At this time, a state in which the magnetic head 101 is positioned in the central zone of the magnetic disk 100 is recognized by the CPU 103. In this case, on the basis of the filter characteristic and qualification level setting table 109A stored in the EEPROM 109 in advance, the filter characteristic of the low-pass filter 105 is set to be the characteristic Z (FIGS. 6 and 7) defined by a cutoff frequency fc of "6.8 MHz" and a boost amount of "5.23 dB", and the binary qualification level TL of the pulse decoder 106 is set to be a low qualification level TL2.

More specifically, when servo information recorded in the peripheral zone of the magnetic disk 100 is to be read back, the cutoff frequency fc of the low-pass filter 105 is set to be higher than the cutoff frequency fc of the filter 4 arranged to only remove high-frequency noise in, e.g., a conventional magnetic disk system (FIG. 1), and a boost amount is set to be large especially on the high-frequency side of a pass frequency range. At the same time, the binary qualification level TL of the pulse decoder 106 is set to be lower than the qualification level TL of the pulse decoder 5 in, e.g., the conventional magnetic disk system (FIG. 1).

In this manner, the peak waveforms corresponding to the flux reversal portions of the servo signal S3 recorded in the innermost tracks of the disk and output through the low-pass filter 105 are sharpened as a whole, and, as indicated by P4' in FIG. 9E, the level of a peak waveform having an amplitude reduced by the influence of a pseudo-gap or a contour effect is raised. For this reason, when the servo signal S3 of the servo data recorded in the innermost tracks of the disk and based on the filter characteristic Z is binarized by the pulse decoder 106 in accordance with the low qualification level TL2, for example, a peak waveform P4' having an amplitude reduced by the influence of the pseudo-gap or contour effect reliably crosses the binary qualification level TL2, and, as indicated by R2 in FIG. 9F, a necessary binary pulse is prevented from being omitted. Therefore, the proper peak waveforms corresponding to the flux reversal portions are correctly binarized.

Therefore, any servo signal read back from the peripheral or innermost tracks of the disk can be correctly binarized, and a track address or a sector address at which the magnetic head 101 is located can be correctly recognized.

Therefore, according to the magnetic disk system, when servo data respectively recorded in the peripheral and innermost tracks of the magnetic disk 100 at low and high densities in synchronism with a predetermined write period are read back and binarized by the magnetic head 101 as flux reversal patterns. In this case, on the basis of the table data stored in the EEPROM 109 in advance, the filter characteristic of the characteristic variable type low-pass filter 105 is variably set to be a characteristic defined by a low cutoff frequency fc and a small boost amount in the peripheral zone and to be a characteristic defined by a high cutoff frequency and a boost amount, which is large on a high-frequency side, on the central zone. In this manner, in the servo signal S1, in the outermost tracks, wherein peak waveforms corresponding to flux reversal portions are sharp, and small peak waveforms generated by the influence of a pseudo-gap or a contour effect are present as independent waveforms, the peak waveforms and contour waveforms are dulled. In addition, in the servo signal S1, in the innermost tracks, wherein peak waveforms corresponding to flux reversal portions are dulled, superposed, and attenuated by the influence of a contour effect, each peak waveform is raised and sharpened. In addition, the binary qualification level TL in the pulse decoder 106 is variably set to be high in the outermost tracks and to be low in the innermost tracks. In this manner, the waveforms of the servo signal S3 supplied to the pulse decoder 106 through the low-pass filter 105 are uniformed on the peripheral and innermost tracks of the disk, and a variation in binary detection margin can be suppressed. Even if a waveform influenced by a pseudo-gap generated by using an MIG head and a contour waveform generated by using a thin film head are present, a binary pulse can be prevented from being accidentally generated or omitted, and a positioning address can be correctly recognized.

In the above embodiment, in a read operation for servo data in the outermost tracks of the disk or in a readback operation for servo data in the innermost tracks of the disk, a filter characteristic and a binary qualification level are variably set. However, when only one of the filter characteristic and the binary qualification level is variably set, an effect of correctly binarizing and recognizing the servo data can be obtained, as is apparent from the description of the arrangement and operations of the embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk system comprising:
    a magnetic disk having servo data recorded in a plurality of tracks of said magnetic disk, wherein said servo data is recorded in all of said plurality of tracks in synchronism with a predetermined write frequency;

a magnetic head for magnetically reading the servo data recorded on said magnetic disk and outputting the servo data as a servo signal;

a filter for shaping a waveform of the servo signal output from said magnetic head;

a pulse decoder for detecting a peak waveform of the servo signal having a waveform shaped by said filter to binarize the servo signal;

positioning means for positioning said magnetic head on a desired track of said plurality of tracks in accordance with the servo signal by said pulse decoder;

detecting means for detecting a position of said magnetic head on said magnetic disk in accordance with the servo signal binarized by said pulse decoder; and setting means, having a plurality of filter characteristics for setting one of the plurality of filter characteristics in said filter in accordance with the position of said magnetic head detected by said detecting means while said positioning means positions said magnetic head on the desired track.

2. A system according to claim 1, wherein said plurality of tracks of said magnetic disk are assigned to a plurality of filter characteristics corresponding to a plurality of zones respectively, the number of zones being less than the number of tracks and being equal to the number of the plurality of filter characteristics, and said setting means determines whether said magnetic head is moved across one of the plurality of zones and sets one of the plurality of filter characteristics corresponding to a zone which includes the detected position of said magnetic head when said magnetic head is moved across one of the plurality of zones.

3. A system according to claim 1, wherein said magnetic head is an MIG (Metal In Gap) head.

4. A system according to claim 1, wherein said magnetic head is a thin film head.

5. A system according to claim 1, wherein each of the plurality of filter characteristics includes a cutoff frequency and a boost amount.

6. A magnetic disk system comprising: a magnetic disk having servo data recorded in a plurality of tracks of said magnetic disk, wherein said servo data is recorded in all of said plurality of tracks in synchronism with a predetermined write frequency;

a magnetic head for magnetically reading the servo data recorded on said magnetic disk and outputting the servo data as a servo signal;

a pulse decoder for detecting a peak waveform of the servo signal output from said magnetic head to binarize the servo signal;

positioning means form positioning said magnetic head on a desired track of said plurality of tracks in accordance with the servo signal binarized by said pulse decoder;

detecting means form detecting a position of said magnetic head on said magnetic disk in accordance with the servo signal binarized by said pulse decoder; and setting means, having a plurality of binary qualification levels, for setting one of the plurality of binary qualification levels in said pulse decoder in accordance with the position of said magnetic head detected by said detecting means while said positioning means positions said magnetic head on the desired track.

7. A system according to claim 6, wherein said plurality of tracks of said magnetic disk are assigned to a plurality of zones, the plurality of binary qualification levels correspond to the plurality of zones respectively, the number of zones being less than the number of tracks and being equal to the number of the plurality of binary qualification levels, and said setting means determines whether said magnetic head is moved across one of the plurality of zones and sets one of the plurality of binary qualification levels corresponding to a zone which includes the detected position of said magnetic head when said magnetic head is moved across one of the plurality of zones.

8. A system according to claim 6, wherein said magnetic head is an MIG (Metal In Gap) head.

9. A system according to claim 6, wherein said magnetic head is a thin film head.

10. A magnetic disk system comprising:

a magnetic disk having servo data recorded in a plurality of tracks of said magnetic disk, said servo data recorded in all of said plurality of tracks in synchronism with a predetermined write frequency;

a magnetic head for magnetically reading the servo data recorded on said magnetic disk and outputting the servo data as a servo signal;

a filter for shaping a waveform of the servo signal output from said magnetic head;

a pulse decoder for detecting a peak waveform of the servo signal having a waveform shaped by said filter to binarize the servo signal;

positioning means for positioning said magnetic head on a desired track of said plurality of tracks in accordance with the servo signal binarized by said pulse decoder;

detecting means for detecting a position of said magnetic head on said magnetic disk in accordance with the servo signal binarized by said pulse decoder;

first setting means, having a plurality of filter characteristics, for setting one of the plurality of filter characteristics in said filter in accordance with the position of said magnetic head detected by said detecting means while said positioning means positions said magnetic head on the desired track; and second setting means, having a plurality of binary qualification levels of said pulse decoder, for setting one of the plurality of binary qualification levels in said pulse decoder in accordance with the position of said magnetic head detected by said detecting means while said positioning means positions said magnetic head on the desired track.

11. A system according to claim 10, wherein said plurality of tracks of said magnetic disk are assigned to a plurality of zones, the plurality of filter characteristics correspond to the plurality of zones respectively, the number of zones being less than the number of tracks and being equal to the number of the plurality of filter characteristics and the number of the plurality of binary qualification levels, said system further comprising:

determining means for determining whether said magnetic head is moved across one of the plurality of zones in accordance with the detected position of said magnetic head by said detecting means, wherein said first setting means sets one of the plurality of filter characteristics corresponding to a zone which includes the detected position of said magnetic head when said magnetic head is moved across one of the plurality of zones, and said second setting means sets one of the plurality of binary qualification levels corresponding to a zone which includes the detected position of said magnetic head when said magnetic head is moved across one of the plurality of zones.

12. A system according to claim 10, wherein said magnetic head is an MIG (Metal In Gap) head.

13. A system according to claim 10, wherein said magnetic head is a thin film head.

14. A system according to claim 10, wherein each of the plurality of filter characteristics includes a cutoff frequency and a boost amount.

15. A servo signal detecting method in a magnetic disk system including a magnetic disk having servo data recorded in a plurality of tracks of said magnetic disk, wherein said servo data is recorded in all of said plurality of tracks in synchronism with a predetermined write frequency and a magnetic head for magnetically reading the servo data recorded on said magnetic disk and outputting the servo data as a servo signal, the method comprising the steps of:

a) shaping a waveform of the servo signal output from said magnetic head;

b) detecting a peak waveform of the servo signal having a waveform shaped in the step a) to binarize the servo signal;

c) positioning said magnetic head on a desired track of the plurality of tracks in accordance with the servo signal binarized n said step b);

d) detecting a position of said magnetic head on said magnetic disk in accordance with the servo signal binarized in said step b); and e) while said magnetic head is positioned on the desired track in said step c), controlling a waveform shaping characteristic in the step a) in accordance with the position of said magnetic head detected in the step d).

16. A method according to claim 15, wherein said magnetic disk system includes a memory for storing a plurality of characteristics for a waveform shaping, all of said plurality of tracks of said magnetic disk are assigned to a plurality of zones, the plurality of characteristics correspond to the plurality of zones respectively, the number of zones being less than the number of tracks and being equal to the number of the plurality of characteristics, and the step d) determines whether said magnetic head is moved across one of the plurality of zones and sets one of the plurality of characteristics corresponding to a zone which includes the detected position of said magnetic head when said magnetic head is moved across one of the plurality of zones.

17. A servo signal detecting method in a magnetic disk system including a magnetic disk having servo data recorded in a plurality of tracks of said magnetic disk, wherein said servo data is recorded in all of said plurality of tracks in synchronism with a predetermined write frequency and a magnetic head for magnetically reading the servo data recorded on said magnetic disk and outputting the servo data as a servo signal, the method comprising the steps of:

a) detecting a peak waveform of the servo signal output from said magnetic head and binarizing the servo signal in accordance with a binary qualification level;

b) positioning said magnetic head on a desired track of the plurality of tracks in accordance with the servo signal binarized in said step a);

c) detecting a position of said magnetic head on said magnetic disk in accordance with the servo signal binarized in the step a); and d) while said magnetic head is positioned on the desired track in said step b), controlling the binary qualification level in accordance with the position of said magnetic head detected in the step c).

18. A method according to claim 17, wherein said magnetic disk system includes a memory for storing a plurality of binary qualification levels, all of said plurality of tracks of said magnetic disk are assigned to a plurality of zones, the plurality of binary qualification levels correspond to the plurality of zones respectively, the number of zones being less than the number of tracks and being equal to the number of the plurality of binary qualification levels, and the step c) determines whether said magnetic head is moved across one of the plurality of zones and sets one of the plurality of binary qualification levels corresponding to a zone which includes the detected position of said magnetic head when said magnetic head is moved across one of the plurality of zones.

19. A servo signal detecting method in a magnetic disk system including a magnetic disk having servo data recorded in a plurality of tracks of said magnetic disk, wherein said servo data is recorded in all of said plurality of tracks in synchronism with a predetermined write frequency and a magnetic head for magnetically reading the servo data recorded on said magnetic disk and outputting the servo data as a servo signal, the method comprising the steps of:

a) shaping a waveform of the servo signal output from said magnetic head;

b) detecting a peak waveform of the servo signal having a waveform shaped in the step a) and binarizing the servo signal in accordance with a binary qualification level;

c) positioning said magnetic head on a desired track of the plurality of tracks in accordance with the servo signal binarized in the step b);

d) detecting a position of said magnetic head on said magnetic disk in accordance with the servo signal binarized in the step b);

e) while said magnetic head is positioned on the desired track in the step c), controlling a waveform shaping characteristic in the step a) in accordance with the position of said magnetic head detected in said step d); and f) while said magnetic head is positioned on the desired track in the step c), controlling the binary qualification level in accordance with the position of said magnetic head detected in step d).

20. A method according to claim 19, wherein said magnetic disk system includes a memory for storing a plurality of characteristics for waveform shaping and a plurality of binary qualification levels, all of said plurality of tracks of said magnetic disk are assigned to a plurality of zones, the plurality of characteristics correspond to the plurality of zones respectively, the number of zones being less than the number of tracks and being equal to the number of the plurality of characteristics and the number of the plurality of binary qualification levels, the method further comprising the steps of:

f) determining whether said magnetic head is moved across zones in accordance with the detected position of said magnetic head in the step c), wherein the step d) sets one of the plurality of characteristics corresponding to a zone which includes the detected position of said magnetic head when said magnetic head is moved across one of the plurality of zones, and the step e) sets one of the plurality of binary qualification levels corresponding to a zone which includes the detected of said magnetic head when said magnetic head is position moved across one of the plurality of zones.

21. A magnetic disk system comprising:

a magnetic disk having servo data recorded in all tracks of said magnetic disk in synchronism with a predetermined write frequency;

a thin film head for magnetically reading the servo data recorded on said magnetic disk and outputting the servo data as a servo signal;

a filter for shaping a waveform of the servo signal output from said thin film head;

a pulse decoder for detecting a peak waveform of the servo signal having a waveform shaped by said filter to binarize the servo signal;

positioning means for positioning said magnetic head on a desired track of the plurality of tracks in accordance with the servo signal binarized by said pulse decoder;

detecting means for detecting a position of said thin film head on said magnetic disk in accordance with the servo signal binarized by said pulse decoder; and setting means, having a plurality of filter characteristics, for setting one of the plurality of filter characteristics in said filter in accordance with the position of said thin film head detected by said detecting mean, while said positioning means positions said magnetic head on the desired track.

22. A system according to claim 21, wherein each of the plurality of filter characteristics includes a cutoff frequency and a boost amount.

23. A magnetic disk system comprising:

a magnetic disk having servo data recorded in all tracks of said magnetic disk in synchronism with a predetermined write frequency;

a thin film head for magnetically reading the servo data recorded on said magnetic disk and outputting the servo data as a servo signal;

a pulse decoder for detecting a peak waveform of the servo signal output from said thin film head to binarize the servo signal;

positioning means for positioning said magnetic head on a desired track of the plurality of tracks in accordance with the servo signal binarized by said pulse decoder;

detecting means for detecting a position of said thin film head on said magnetic disk in accordance with the servo signal binarized by said pulse decoder; and setting means, having a plurality of binary qualification levels, for setting one of the plurality of binary qualification levels in said pulse decoder in accordance with the position of said thin film head detected by said detecting means, while said positioning means positions said magnetic head on the desired track.

24. A magnetic disk system comprising:

a magnetic disk having servo data recorded in all tracks of said magnetic disk in synchronism with a predetermined write frequency;

a thin film head for magnetically reading the servo data recorded on said magnetic disk and outputting the servo data as a servo signal;

a filter for shaping a waveform of the servo signal output from said thin film head;

a pulse decoder for detecting a peak waveform of the servo signal having a waveform shaped by said filter to binarize the servo signal;

positioning means for positioning said magnetic head on a desired track of the plurality of tacks in accordance with the servo signal binarized by said pulse decoder;

detecting means for detecting a position of said thin film head on said magnetic disk in accordance with the servo signal binarized by said pulse decoder;

first setting means, having a plurality of filter characteristics, for setting one of the plurality of filter characteristics in said filter in accordance with the position of said thin film head detected by said detecting means, while said positioning means positions said magnetic head on the desired track, second setting means, having a plurality of binary qualification levels of said pulse decoder, for setting one of the plurality of binary qualification levels in said pulse decoder in accordance with the position of said thin film head detected by said detecting means while said positioning means positions said magnetic head on the desired track.

25. A system according to claim 24, wherein each of the plurality of filter characteristics includes a cutoff frequency and a boost amount.

* * * * *